United States Patent
Imas et al.

(10) Patent No.: US 12,333,399 B2
(45) Date of Patent: Jun. 17, 2025

(54) ANOMALY DETECTION USING MACHINE LEARNING MODELS AND SIMILARITY REGULARIZATION

(71) Applicant: PepsiCo, Inc., Purchase, NY (US)

(72) Inventors: Michael Imas, Purchase, NY (US); Ryan Saxe, Purchase, NY (US)

(73) Assignee: PepsiCo, Inc., Purchase, NY (US)

( * ) Notice: Subject to any disclaimer, the term of this patent is extended or adjusted under 35 U.S.C. 154(b) by 935 days.

(21) Appl. No.: 17/348,294

(22) Filed: Jun. 15, 2021

(65) Prior Publication Data

US 2022/0398503 A1 Dec. 15, 2022

(51) Int. Cl.
*G06N 20/20* (2019.01)
*G06F 18/22* (2023.01)

(52) U.S. Cl.
CPC .............. *G06N 20/20* (2019.01); *G06F 18/22* (2023.01)

(58) Field of Classification Search
CPC ................................. G06N 20/20; G06F 18/22
See application file for complete search history.

(56) References Cited

U.S. PATENT DOCUMENTS

| 6,922,700 B1* | 7/2005 | Aggarwal | G06F 16/2228 |
| | | | 707/999.102 |
| 11,494,612 B2* | 11/2022 | Chen | G06N 3/08 |
| 2015/0363688 A1* | 12/2015 | Gao | G06N 3/045 |
| | | | 706/27 |
| 2016/0147799 A1* | 5/2016 | Cohen | G06F 16/2365 |
| | | | 706/12 |

(Continued)

FOREIGN PATENT DOCUMENTS

| CN | 111602149 A * | 8/2020 | ......... G06F 16/9024 |
| WO | WO-02095534 A2 * | 11/2002 | ........... G06K 9/6215 |

(Continued)

OTHER PUBLICATIONS

Kang, Feng, Rong Jin, and Joyce Y. Chai. "Regularizing translation models for better automatic image annotation." Proceedings of the thirteenth ACM international conference on Information and knowledge management. (Year: 2004).*

(Continued)

*Primary Examiner* — Shahid K Khan
(74) *Attorney, Agent, or Firm* — Sterne, Kessler, Goldstein & Fox P.L.L.C.

(57) ABSTRACT

Disclosed herein are embodiments for anomaly detection using machine learning models (MLMs) and similarity regularization. An embodiment operates by obtaining data for a first product, a second product, and a target product. The data include a set of sparse data points for the target product. Next, similarity scores between the target product and the first product and the second product may be calculated. The embodiment further operates by generating a target MLM associated with the target product using a regularization penalty. The regularization penalty is based on the similarity scores and distances between a target set of coefficients for the target MLM and coefficients for a first MLM and a second MLM associated with the first product and the second product, respectively. The embodiment may then detect an anomaly associated with the target product by feeding the target MLM with a feature vector associated with the target product.

20 Claims, 3 Drawing Sheets

(56) References Cited

U.S. PATENT DOCUMENTS

| | | | | |
|---|---|---|---|---|
| 2016/0165178 | A1* | 6/2016 | al-Salem | G06T 5/50 348/441 |
| 2017/0285123 | A1* | 10/2017 | Kaditz | G01R 33/5608 |
| 2019/0095313 | A1* | 3/2019 | Xu | G06F 18/24323 |
| 2019/0108444 | A1* | 4/2019 | Song | G06N 3/045 |
| 2019/0244253 | A1* | 8/2019 | Vij | G06F 18/214 |
| 2019/0347523 | A1* | 11/2019 | Rothberg | G06N 3/045 |
| 2020/0028862 | A1* | 1/2020 | Lin | H04L 63/104 |

FOREIGN PATENT DOCUMENTS

| | | | | |
|---|---|---|---|---|
| WO | WO-2014205231 | A1 * | 12/2014 | G06K 9/62 |
| WO | WO-2020118517 | A1 * | 6/2020 | |

OTHER PUBLICATIONS

Wang, Gang, David Forsyth, and Derek Hoiem. "Improved object categorization and detection using comparative object similarity." IEEE transactions on pattern analysis and machine intelligence 35.10 (2013): 2442-2453. (Year: 2013).*

International Search Report and Written Opinion of the International Searching Authority directed to related International Patent Application No. PCT/US2022/033403, mailed Oct. 18, 2022; 8 pages.

Porwal et al., "Outlier Detection by Consistent Data Selection Method," arXiv, Aug. 21, 2018; 7 pages.

Wang et al., "Improved object categorization and detection using comparative object similarity," IEEE, Transactions on Pattern Analysis and Machine Intelligence, vol. 35, No. 10, Mar. 19, 2013; pp. 1-14.

Felipe Almeida and Geraldo Xexéo. 2019. Word Embeddings: A Survey. arXiv:1901.09069 [cs.CL].

Hongyun Cai, Vincent W. Zheng, and Kevin Chen-Chuan Chang. 2018. A Comprehensive Survey of Graph Embedding: Problems, Techniques and Applications. arXiv:1709.07604 [cs.AI].

Ting Chen, Simon Kornblith, Mohammad Norouzi, and Geoffrey Hin-ton. 2020. A Simple Framework for Contrastive Learning of Visual Representations. arXiv:2002.05709 [cs.LG].

Ting Chen, Simon Kornblith, Kevin Swersky, Mohammad Norouzi, and Geoffrey Hinton. 2020. Big Self-Supervised Models are Strong Semi-Supervised Learners. arXiv:2006.10029 [cs.LG].

R. Hadsell, S. Chopra, and Y. LeCun. 2006. Dimensionality Reduction by Learning an Invariant Mapping. In *2006 IEEE Computer Society Conference on Computer Vision and Pattern Recognition (CVPR'06)*, vol. 2. 1735-1742. https://doi.org/10.1109/CVPR.2006.100.

Arthur E. Hoerl and Robert W. Kennard. 1970. Ridge Regression: Biased Estimation for Nonorthogonal Problems. *Technometrics* 12, 1 (1970), 55-67. https://doi.org/10.1080/00401706.1970.10488634.

L. Jing and Y. Tian. 2020. Self-supervised Visual Feature Learning with Deep Neural Networks: A Survey. *IEEE Transactions on Pattern Analysis and Machine Intelligence* (2020), 1-1. https://doi.org/10.1109/TPAMI.2020.2992393.

E. Liebscher. 2012. A Universal Selection Method in Linear Regression Models. , 153-162 pages. https://doi.org/10.4236/ojs.2012.22017.

Robert Tibshirani. 1996. Regression Shrinkage and Selection Via the Lasso. *Journal of the Royal Statistical Society: Series B (Methodological)* 58, 1 (1996), 267-288. https://doi.org/10.1111/j.2517-6161.1996.tb02080. x.

Hui Zou and Trevor Hastie. 2005. Regularization and Variable Selection via the Elastic Net. *Journal of the Royal Statistical Society. Series B (Statistical Methodology)* 67, 2 (2005), 301-320.

Extended European Search Report for EP Application No. EP22825655.8, dated Apr. 23, 2025, 10 pages.

Tian, P., et al., "Consistent Meta-Regularization for Better Meta-Knowledge in Few-Shot Learning," IEEE Transactions on Neural Networks and Learning Systems, vol. 33, No. 12, pp. 7277-788. (Jun. 9, 2021).

Li, Q., et al., "Model-Contrastive Federated Learning," arXiv:2013.16257v1 [cs.LG], Cornell University Library, 12 pages, (Mar. 30, 2021).

Tanveer, M., et al., "Batch Constrative Regularization for Deep Neural Network," Proceedings of the 12$^{th}$ International Joint Conference on Computational Intelligence (IJCCI 2020), pp. 368-377, (Nov. 2, 2020).

Tian, P. and Gao, Y., "Improvising meta-learning model via meta-contrastive loss," Frontiers of Computer Science, vol. 16, No. 5, 165331, pp. 1-7, Springer, (Jan. 8, 2022).

* cited by examiner

ANOMALY DETECTION USING MACHINE LEARNING MODELS AND SIMILARITY REGULARIZATION

BACKGROUND

Machine learning models are frequently used to solve or mitigate industrial and technological problems. For example, machine learning models are frequently used to perform anomaly detection and thus identify unexpected (e.g., suspicious) items or events in data sets. In order to meaningfully train a machine learning model for anomaly detection and/or other operations, it is often necessary to have a large (e.g., dense) set of training data points. If for any reason the set of training data points is sparse, performance of the machine learning model may suffer. For example, in the case of anomaly detection, a sparse set of training data points may result in the machine learning model missing unexpected (e.g., suspicious) items/events (e.g., false negatives) and/or in the machine learning model improperly flagging routine items/events as unexpected (e.g., false positives).

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
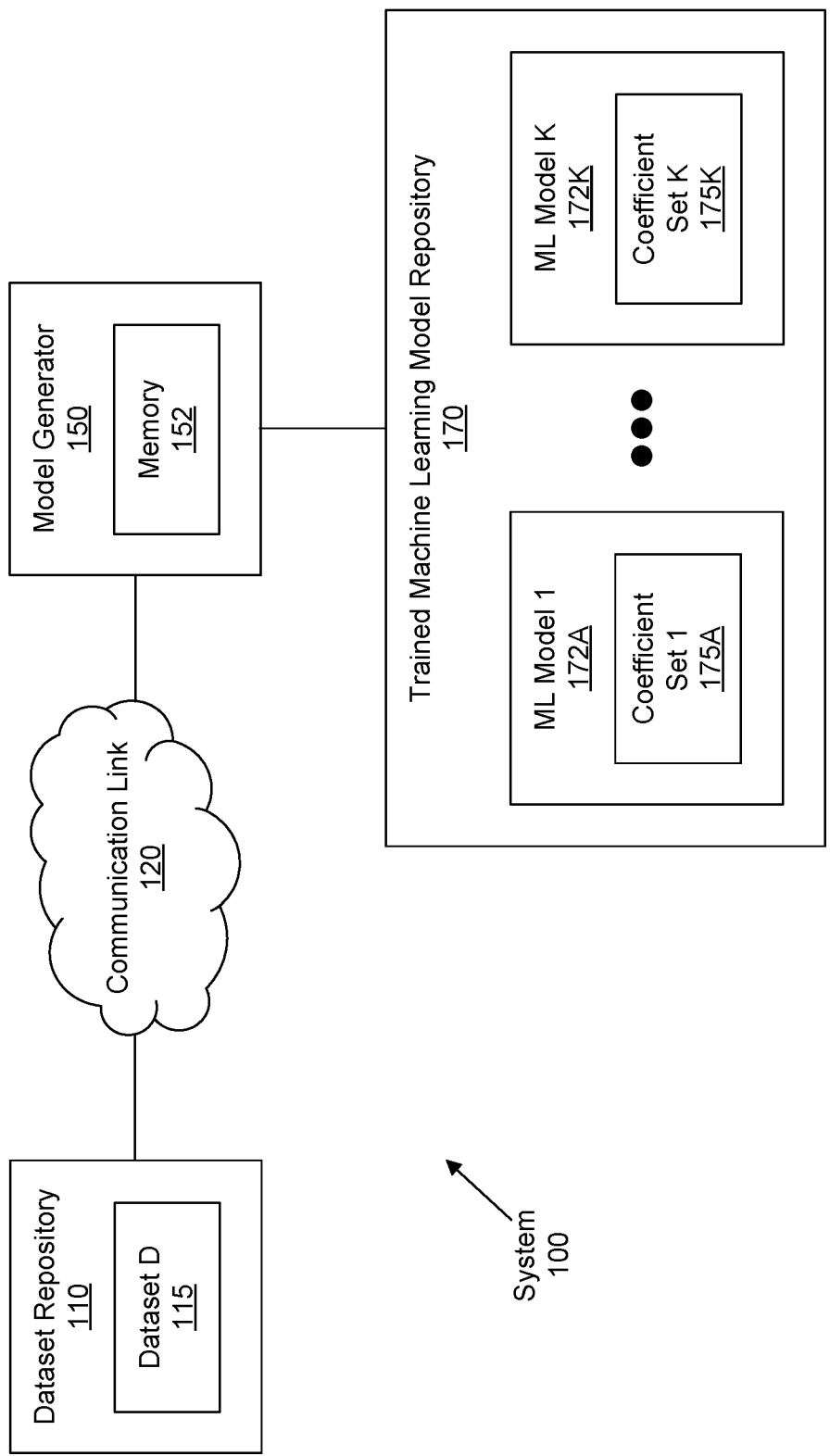
FIG. 1 shows a block diagram of a system for anomaly detection using machine learning models and similarity regularization in accordance with one or more embodiments.

Provided herein are system, apparatus, device, method and/or computer program product embodiments, and/or combinations and sub-combinations thereof, for anomaly detection using a machine learning model and similarity regularization. One or more embodiments include storing data points for multiple entities (e.g., products, devices, etc.), where the data points include a sparse set of data points for a target entity (e.g., target product). One or more machine learning models may be generated for the entities. In order to determine coefficients for the machine learning model associated with the target entity (having a sparse set of data points), the coefficients of other models associated with other entities that are similar to the target entity may be leveraged. This may be referred to as similarity regularization. Similarity regularization may eliminate or at least mitigate the false negatives and false positives that can arise from anomaly detection using a machine learning model trained with a sparse data set. The generated models may then be used to perform anomaly detection in a variety of industrial and technological fields.

For example, anomaly detection may correspond to potential failure detection in devices such as medical devices. The input to the machine learning model may be a feature vector based on sensor readings from the device, while the output of the machine learning model may be a probability of the device failing within some time window. If the device is new, only a sparse set of training data points may be available to train the machine learning model. However, if the device is similar to other devices that have been available for multiple years (and thus dense training data points exist for these similar devices), similarity regularization may be used to train the machine learning model (discussed below).

As another example, anomaly detection may correspond to fraud detection in credit card transactions. A credit card company may need to estimate the likelihood of a live transaction being fraudulent. The input to the machine learning model may be one or more attributes of the transaction (e.g., price, zip code, time, type of store, type of items, number of items, etc.), while the output of the machine learning model may be a probability of the transaction being fraudulent. If the consumer of the transaction belongs to a consumer group with a sparse set of training data points and if only this sparse set of training data points is used to train the machine learning model, performance of the machine learning model may suffer (e.g., false positives for fraud). However, if one or more similar consumer groups have dense sets of training data points, similarity regularization may be used to train the machine learning model (discussed below) and reduce the false positives.

In the consumer packaged goods (CPG) context, it may be advantageous to detect anomalies in the manufacturing process (e.g. producing a defective batch of product) or in business or economic settings (e.g. adverse results of competition, sales, market share, marketing or external shock such as global viral pandemic). As a concrete example, suppose an established market of tortilla chips exists, and then a new entrant to the market arrives whose product is highly favored by the consumers. Introduction of a strong competitive brand would affect pricing power and market share dynamics of existing brands/products in anomalous ways. These effects may be captured by various econometric models, and these models can be augmented using similarity regularization (e.g., using dense sets of training data points associated with similar products).

FIG. 1 shows a system 100 for anomaly detection using machine learning models and similarity regularization in accordance with one or more embodiments. System 100 may have multiple components including a dataset repository 110, a model generator 150, and a trained machine learning model repository 170. Each of these components may be implemented on a computer system such as computer system 300, discussed below in reference to FIG. 3. Two or more of the components (e.g., dataset repository 110 and model generator 150) may be connected by a communication link 120. The communication link 120 may correspond to an Ethernet connection, a cellular connection, an infrared connection, a fiber optic connection, a Bluetooth connection, etc. In short, communication link 120 may correspond to any type of wired and/or wireless connection.

In one or more embodiments, dataset repository 110 stores a dataset D 115. Dataset D 115 may include multiple data points for multiple entities. Each data point may correspond to an entity. There may be K entities (K≥2) and thus K sets of data points in dataset D 115. Different entities may have different numbers of data points in dataset D 115. For example, some entities may have many data points (i.e., a dense set of data points), while other entities may have fewer data points (i.e., a sparse set of data points).

Each data point may include a feature vector $\vec{x}_i$ and an output $\vec{y}_i$. $D_j(X_j, Y_j)$ or simply $D_j$ denotes the set of data points (in dataset D 115) corresponding to entity j. Accordingly, $|D_j|$ denotes the number of data points in the set of data points corresponding to entity j.

In one or more embodiments, each of the K entities may be a product such as, for example, a device (e.g., medical device) or a consumer packaged good. In such scenarios, the feature vector may correspond to attributes of the product or even sensor readings taken by the product, while the output may be a probability of the product failing. Additionally or alternatively, each of the K entities may be a group or cluster of consumers who share similar social-economic traits or spending patterns. In such scenarios, the feature vector may be attributes of a transaction such as a credit card transaction allegedly involving a consumer from the group, and the output may be a probability of the transaction being fraudulent.

In one or more embodiments, the model generator 150 is configured to generate supervised machine learning models for the multiple entities. The data points in dataset D 115 may be used to train the models and model generator 150 may include a memory 152 for storing some or all of the data points for generating the models. For example, the model $M_j$ generated for entity j may have the form $Mj(X_j)=Y_j+\varepsilon$, where $\varepsilon$ is an error.

In one or more embodiments, generating a supervised machine learning model includes fitting a set of coefficients $\vec{\beta}$ to the training data for the machine learning model. In one or more embodiments, model generator 150 determines the set of coefficients for a model associated with entity j based on the coefficients for other models associated with other entities that are similar to entity j (discussed below in reference to FIG. 2).

In one or more embodiments, trained machine learning model repository 170 stores the machine learning models that have been generated by model generator 150. As shown in FIG. 1, trained machine learning model repository 170 may store machine learning model 1 172A, machine learning model K 172K, etc. Each of the machine learning models 172 may correspond to one of the entities. Each of the machine learning models 172 may include and utilize a set of coefficients to generate an output based on an input feature vector. For example, machine learning model 1 172A may include coefficient set 1 175A, while machine learning model K 172K may include coefficient set K 175K. As discussed below, depending on the entity and the features in the feature vectors, one or more of the machine learning models 172 may be used for anomaly detection including detecting the failure of the corresponding entity (e.g., device), detecting fraudulent transactions, detecting network security breaches, etc.

Figure 2:
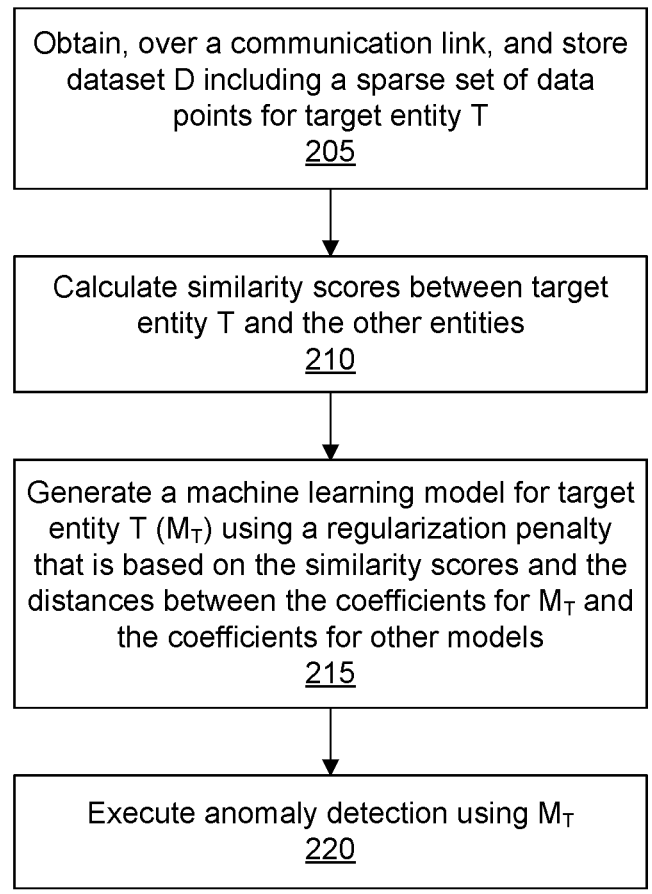
FIG. 2 shows a flowchart for anomaly detection using machine learning models and similarity regularization in accordance with one or more embodiments.

FIG. 2 is a flowchart for a method 200 for anomaly detection using machine learning models and similarity regularization in accordance with one or more embodiments. Method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art.

Method 200 shall be described with reference to FIG. 1. However, method 200 is not limited to that example embodiment.

In 205, model generator 150 may obtain and store the dataset D 115. Some or all of the dataset 115 may be obtained from dataset repository 110 via communication link 120. The dataset D 115 may include multiple sets of data points, with each set of data points corresponding to an entity. As discussed above, there may be K entities (K≥2) and thus K sets of data points in dataset D. Each data point may include a feature vector $\vec{x}_i$ and an output $y_i$. $D_j(X_j, Y_j)$ or simply $D_j$ denotes the set of data points (in dataset D) corresponding to entity j. Accordingly, $|D_j|$ denotes the number of data points in the set of data points corresponding to entity j.

In one or more embodiments, at least one of the multiple entities, a target entity T, has a sparse set of data points. $D_T(X_T, Y_T)$ or simply $D_T$ denotes the set of data points belonging to target entity T. $D_T(X_T, Y_T)$ may be referred to as a sparse set because the number of data points in $D_T$ (i.e., $|D_T|$) may be less than the number of features in the feature vector of each data point in $D_T$. In one or more embodiments, this sparse set of data points is deliberate. For example, dataset repository 110 may have additional data points for the target entity T, but these additional data points are not transmitted to the model generator 150 in order to reduce bandwidth consumption on the communication link 120. Additionally or alternatively, these additional data points are not transmitted to the model generator 150 in order to reduce the memory space required in the model generator 150 to store the data points.

In one or more embodiments, the sparse set of data points for the target entity T is the result of storage corruption and/or stolen data. For example, at one time in the past, data set repository 110 may have stored additional data points for the target entity T, but those data points were lost because the dataset repository became damaged or corrupted (e.g., file corruption, hard drive failure, etc.) or the data points were accidentally or intentionally deleted. Additionally or alternatively, these additional data points may have been stolen during a security breach of the dataset repository 110 by a hacker.

In one or more embodiments, the sparse set of data points for the target entity T is the result of an accelerated sampling scheme. In such a scheme, the time required to perform the sampling may be shorter because fewer sample data points are taken. It is a trade-off between the number of samples and the time to acquire the sample set. Additionally or alternatively, the sparse set of data points may be the result of target entity T being a new product on the market, and thus there has been little time to acquire data points for target entity T and/or little customer feedback regarding target entity T.

In 210, model generator 150 may calculate similarity scores between the target entity T and each of the other entities. In one or more embodiments, the similarity score between two entities is based on the embeddings for each entity, where an embedding is a vector of numbers describing/representing the entity. For example, if $\vec{e}_T$ and $\vec{e}_j$ are the embeddings for the target entity T and entity j, respectively, a cosine similarity between these two embeddings may be calculated as:

$$\cos(\vec{e}_T, \vec{e}_j) = \frac{\vec{e}_T \cdot \vec{e}_j}{\|\vec{e}_T\| \|\vec{e}_j\|}$$

In one or more embodiments, the cosine similarity may then be compared to a similarity threshold θ. If the cosine similarity exceeds threshold, then the target entity T and entity j may be deemed similar, and the similarity score $Z_{T,j}$ for the target entity and entity j is set to 1. If the cosine similarity is less than or equal to the similarity threshold, then the target entity T and entity j may be considered dissimilar, and the similarity score $Z_{T,j}$ for the target entity and entity j is set to 0. Expressed mathematically:

$$Z_{T,j} = \begin{cases} 1 \text{ if } \cos(\vec{e}_T, \vec{e}_j) > \theta \\ 0 \text{ if } \cos(\vec{e}_T, \vec{e}_j) \le \theta \end{cases}$$

In 215, model generator 150 may generate supervised machine learning models M for each of the K entities including the target entity T. The machine learning model for entity j may be referred to as $M_j$. Similarly, the machine learning model for the target entity T may be referred to as $M_T$. $D_j$ may be used as training data for $M_j$. Similarly, $D_T$ may be used as training data for $M_T$.

Those skilled in the art, having the benefit of this disclosure, will appreciate that generating a supervised machine learning model includes fitting a set of coefficients $\vec{\beta}$ to the training data. $\vec{\beta}_j$ denotes the set (e.g. vector) of coefficients for $M_j$. Similarly, $\vec{\beta}_T$ denotes the set (e.g., vector) of coefficients for $M_T$. Because of its affiliation with $M_T$ and target entity T, $\vec{\beta}_T$ may be referred to as the target set (e.g., vector) of coefficients.

In one or more embodiments, the fitting procedure during generation of a machine learning model includes minimizing (or at least attempting to minimize) an objective loss function through the selection of the coefficients $\vec{\beta}$. The object function may include a regularization penalty P. For example, the objective loss function for $M_T$ may have regularization penalty $P_T$, and may be expressed as:

$$\frac{1}{|D_T|}\sum_{i=1}^{|D_T|}(M_T(x_i) - y_i)^2 + P_T$$

Similarly, the objective loss function for Mj may have regularization penalty $P_j$, and may be expressed as:

$$\frac{1}{|D_j|}\sum_{i=1}^{|D_j|}(M_j(x_i) - y_i)^2 + P_j$$

A conventional regularization penalty may attempt to prevent overfitting by squeezing $\vec{\beta}_T$ and $\vec{\beta}_j$ towards zero. In one or more embodiments, rather than squeezing coefficients towards zero, the regularization penalty (e.g., $P_T$) may squeeze coefficients of similar entities to be close to each other. This may be referred to as similarity regularization. If it is a reasonable prior that $M_j$ and $M_T$ behave similarly if entity j and target entity T are similar, then it is also reasonable to influence the coefficients of $M_T$ (e.g., $\vec{\beta}_T$) by the coefficients of $M_j$ (e.g., $\vec{\beta}_j$). Similarity regularization may be used in response to the sparse set of data points for target entity T.

Accordingly, in one or more embodiments, the regularization penalty $P_T$ in the objective loss function for $M_T$ may be expressed as:

$$\frac{1}{|K|-1}\sum_{i=0}^{|K|}CL(\vec{\beta}_T, \vec{\beta}_i)$$

where $$CL(\vec{\beta}_T, \vec{\beta}_i) = Z_{t,i}\frac{1}{2}d(\vec{\beta}_T, \vec{\beta}_i) + (1 - Z_{t,i})\frac{1}{2}\max\{0, m - d(\vec{\beta}_T, \vec{\beta}_i)\}$$

where $CL(\vec{\beta}_T, \vec{\beta}_i)$ is a contrastive loss function, $Z_{t,i}$ is the similarity score between target entity T and entity i from 210 (above), where $d(\vec{\beta}_T, \vec{\beta}_i)$ is a distance between the vectors $\vec{\beta}_T$ and $\vec{\beta}_i$ (e.g., $d(\vec{\beta}_T, \vec{\beta}_i) = \|\vec{\beta}_T - \vec{\beta}_i\|_2$), and m is a minimum margin parameter (m>0) describing the minimum margin dissimilar entity coefficient vectors should be from each other. In other words, if target entity T and entity i are indeed dissimilar, $\vec{\beta}_T$ and $\vec{\beta}_i$ should be separated by a distance of at least m.

In order to minimize $CL(\vec{\beta}_T, \vec{\beta}_i)$, if $Z_{t,i}=1$, then $d(\vec{\beta}_T, \vec{\beta}_i)$ should be made as close to zero as possible. In contrast, if $Z_{t,i}=0$, then $d(\vec{\beta}_T, \vec{\beta}_i)$ should equal or exceed m to minimize $CL(\vec{\beta}_T, \vec{\beta}_i)$. This mathematically incentivizes the coefficients of $M_T$ (e.g., $\vec{\beta}_T$) and $M_i$ (e.g., $\vec{\beta}_i$) to be similar if target entity T and entity i are similar, and dissimilar otherwise.

Accordingly, the objective loss function for $M_T$ may be expressed as:

$$\frac{1}{|D_T|}\sum_{i=1}^{|D_T|}(M_T(x_i) - y_i)^2 + P_T =$$

$$\frac{1}{|D_T|}\sum_{i=1}^{|D_T|}(M_T(x_i) - y_i)^2 + \frac{1}{|K|-1}\sum_{i=0}^{|K|}CL(\vec{\beta}_T, \vec{\beta}_i)$$

By using this regularization penalty (which includes a sum of contrastive loss functions), it may still possible to achieve a quality set of coefficients (e.g., $\vec{\beta}_T$) even though only a sparse set of data points exists for the target entity T. This regularization penalty (including the sum of contrastive loss functions) effectively leverages the overall dense set of data points for similar and dissimilar entities to overcome (or at least mitigate) the sparsity of data points for the target entity. As discussed above, the use of this regularization penalty may be referred to as similarity regularization.

Accordingly, if the sparse set of data points for target entity T is the result of corrupted storage, deletion, theft during a security breach, deliberate exclusion of some data points to reduce communication bandwidth, deliberate exclusion of some data points to reduce memory storage requirements, implementation of an accelerated sampling scheme, etc. (discussed above), the use of this regularization penalty (which includes a sum of contrastive loss functions) may be used to overcome (or at least mitigate) the sparsity of the data points. Accordingly, the use of his regularization penalty is effectively a contribution and/or improvement to the one or more technical fields including data recovery, data compression for storage, communication bandwidth reduction, accelerated sampling schemes, etc.

In 220, one or more of the generated machine learning models may be used for anomaly detection (e.g., device failure detection, fraud detection in credit card transactions, anomaly detection in the context of CPGs, etc.). For example, a feature vector associated with target entity T may be fed to $M_T$ as an input. The output of $M_T$ may be a value reflecting the probability that the feature vector is an anomaly and/or target entity T is experiencing a rare or suspicious event. In one or more embodiments, an anomaly is declared if the probability exceeds some threshold value (e.g., 65%). Because similarity regularization was used to generate $M_T$, $M_T$ is less likely to generate erroneous probabilities and thus false positives and/or false negatives are less likely to occur.

Figure 3:
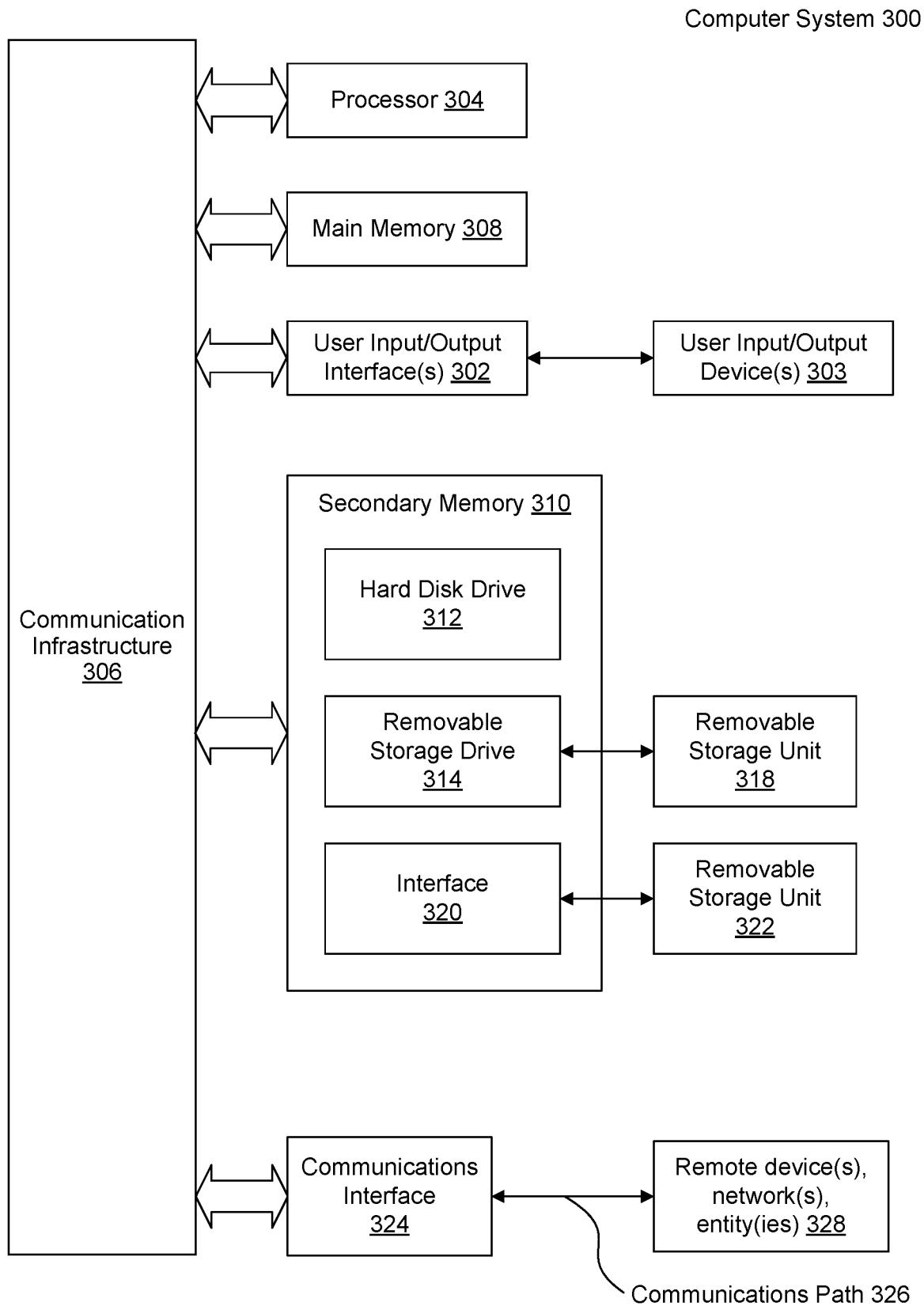
FIG. 3 shows an example computer system useful for implementing various embodiments.

Various embodiments may be implemented, for example, using one or more well-known computer systems, such as computer system 300 shown in FIG. 3. One or more computer systems 300 may be used, for example, to implement any of the embodiments discussed herein, as well as combinations and sub-combinations thereof.

Computer system 300 may include one or more processors (also called central processing units, or CPUs), such as a processor 304. Processor 304 may be connected to a communication infrastructure or bus 306.

Computer system 300 may also include user input/output device(s) 303, such as monitors, keyboards, pointing devices, etc., which may communicate with communication infrastructure 306 through user input/output interface(s) 302.

One or more of processors 304 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 300 may also include a main or primary memory 308, such as random access memory (RAM). Main memory 308 may include one or more levels of cache. Main memory 308 may have stored therein control logic (i.e., computer software) and/or data.

Computer system 300 may also include one or more secondary storage devices or memory 310. Secondary memory 310 may include, for example, a hard disk drive 312 and/or a removable storage device or drive 314. Removable storage drive 314 may be a floppy disk drive, a magnetic tape drive, a compact disk drive, an optical storage device, tape backup device, and/or any other storage device/drive.

Removable storage drive 314 may interact with a removable storage unit 318. Removable storage unit 318 may include a computer usable or readable storage device having stored thereon computer software (control logic) and/or data. Removable storage unit 318 may be a floppy disk, magnetic tape, compact disk, DVD, optical storage disk, and/any other computer data storage device. Removable storage drive 314 may read from and/or write to removable storage unit 318.

Secondary memory 310 may include other means, devices, components, instrumentalities or other approaches for allowing computer programs and/or other instructions and/or data to be accessed by computer system 300. Such means, devices, components, instrumentalities or other approaches may include, for example, a removable storage unit 322 and an interface 320. Examples of the removable storage unit 322 and the interface 320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 300 may further include a communication or network interface 324. Communication interface 324 may enable computer system 300 to communicate and interact with any combination of external devices, external networks, external entities, etc. (individually and collectively referenced by reference number 328). For example, communication interface 324 may allow computer system 300 to communicate with external or remote devices 328 over communications path 326, which may be wired and/or wireless (or a combination thereof), and which may include any combination of LANs, WANs, the Internet, etc. Control logic and/or data may be transmitted to and from computer system 300 via communication path 326.

Computer system 300 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 300 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 300 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 300, main memory 308, secondary memory 310, and removable storage units 318 and 322, as well as tangible articles of manufacture embodying any combination of the foregoing. Such control logic, when executed by one or more data processing devices (such as computer system 300), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 3. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method for anomaly detection using machine learning models and similarity regularization, comprising:

storing, by at least one processor, a plurality of data points for a plurality of products comprising a first product, a second product, and a target product in a memory, wherein the plurality of data points comprises a sparse set of data points for the target product;

calculating, by the at least one processor, in response to an indication from a trained machine learning (ML) model associated with the first product that a target ML model evaluation for the target product failed to detect an anomaly for the target product, a first similarity score between the first product and the target product and a second similarity score between the second product and the target product;

calibrating, by the at least one processor and in response to the sparse set of data points, the target ML model using a regularization penalty that is based on:

the first similarity score and the second similarity score, a first distance between a first set of coefficients for the trained ML and a target set of coefficients for the target ML model, and a second distance between a second set of coefficients for another trained ML model associated with the second product and the target set of coefficients; and receiving, by the at least one processor, based on feeding a feature vector associated with the target product into the target ML model, an indication that the target ML model detected the anomaly for the target product.

2. The method of claim 1, wherein the first product, the second product, and the target product are consumer packaged goods (CPGs).

3. The method of claim 1, wherein the first product, the second product, and the target product are medical devices, and wherein the anomaly is failure of the target product.

4. The method of claim 1, wherein calculating the first similarity score comprises:

calculating, by the at least one processor, a first cosine similarity between an embedding for the first product and an embedding for the target product;

comparing the first cosine similarity with a similarity threshold; and in response to the first cosine similarity exceeding the similarity threshold, determining the first product and the target product are similar and setting the first similarity score to 1.

5. The method of claim 4, wherein calculating the second similarity score comprises:

calculating, by the at least one processor, a second cosine similarity between an embedding for the second product and the embedding for the target product;

comparing the second cosine similarity with the similarity threshold; and in response to the second cosine similarity falling below the similarity threshold, determining the second product and the target product are dissimilar and setting the second similarity score to 0.

6. The method of claim 1, wherein the regularization penalty comprises:

a sum of at least a first contrastive loss function associated with the first distance and a second contrastive loss function associated with the second distance.

7. The method of claim 6, wherein the first contrastive loss function comprises:

a product of $Z_{T,1} d(\vec{\beta}_T, \vec{\beta}_1)$, wherein $Z_{T,1}$ is the first similarity score between the first product and the target product, and wherein $d(\vec{\beta}_T, \vec{\beta}_1)$ is the first distance.

8. The method of claim 6, wherein the second contrastive loss function comprises:

a product of $(1-Z_{T,2}) \max\{0, m-d(\vec{\beta}_T, \vec{\beta}_2)\}$, wherein $Z_{T,2}$ is the second similarity score between the second product and the target product, wherein $d(\vec{\beta}_T, \vec{\beta}_2)$ is the second distance, and wherein m is a minimum margin parameter.

9. A system for anomaly detection using machine learning models and similarity regularization, comprising:
a memory; and
at least one processor coupled to the memory and configured to:
store a plurality of data points for a plurality of products comprising a first product, a second product, and a target product in the memory, wherein the plurality of data points comprises a sparse set of data points for the target product;
calculate, in response to an indication from a trained machine learning (ML) model associated with the first product that a target ML model evaluation for the target product failed to detect an anomaly for the target product, a first similarity score between the first product and the target product and a second similarity score between the second product and the target product;
calibrate, in response to the sparse set of data points, the target ML model using a regularization penalty that is based on:
the first similarity score and the second similarity score,
a first distance between a first set of coefficients for the trained ML and a target set of coefficients for the target ML model, and
a second distance between a second set of coefficients for another trained second ML model associated with the second product and the target set of coefficients; and
receive, based on feeding a feature vector associated with the target product into the target ML model, an indication that the target ML model detected the anomaly for the target product.

10. The system of claim 9, wherein to calculate the first similarity score the at least one processor is further configured to:
calculate a first cosine similarity between an embedding for the first product and an embedding for the target product;
compare the first cosine similarity with a similarity threshold; and
in response to the first cosine similarity exceeding the similarity threshold, determine the first product and the target product are similar and setting the first similarity score to 1.

11. The system of claim 10, wherein to calculate the second similarity score the at least one processor is further configured to:
calculate a second cosine similarity between an embedding for the second product and the embedding for the target product;
compare the second cosine similarity with the similarity threshold; and
in response to the second cosine similarity falling below the similarity threshold, determine the second product and the target product are dissimilar and setting the second similarity score to 0.

12. The system of claim 9, wherein the regularization penalty comprises:
a sum of at least a first contrastive loss function associated with the first distance and a second contrastive loss function associated with the second distance.

13. The system of claim 12, wherein the first contrastive loss function comprises:

a product of $Z_{T,1} d(\vec{\beta}_T, \vec{\beta}_1)$, wherein $Z_{T,1}$ is the first similarity score between the first product and the target product, and wherein $d(\vec{\beta}_T, \vec{\beta}_1)$ is the first distance.

14. The system of claim 12, wherein the second contrastive loss function comprises:
a product of $(1-Z_{T,2})\max\{0, m-d(\vec{\beta}_T, \vec{\beta}_2)\}$, wherein $Z_{T,2}$ is the second similarity score between the second product and the target product, wherein $d(\vec{\beta}_T, \vec{\beta}_2)$ is the second distance, and wherein m is a minimum margin parameter.

15. A non-transitory computer-readable medium having instructions stored thereon for anomaly detection using machine learning models and similarity regularization, the instructions, when executed by at least one computing device, cause the at least one computing device to perform operations comprising:
storing a plurality of data points for a plurality of products comprising a first product, a second product, and a target product in a memory, wherein the plurality of data points comprises a sparse set of data points for the target product;
calculating, in response to an indication from a trained machine learning (ML) model associated with the first product that a target ML model evaluation for the target product failed to detect an anomaly for the target product, a first similarity score between the first product and the target product and a second similarity score between the second product and the target product;
calibrating, in response to the sparse set of data points, the target ML model using a regularization penalty that is based on:
the first similarity score and the second similarity score,
a first distance between a first set of coefficients for the trained ML and a target set of coefficients for the target ML model, and
a second distance between a second set of coefficients for another trained ML model associated with the second product and the target set of coefficients; and
receiving, based on feeding a feature vector associated with the target product into the target ML model, an indication that the target ML model detected the anomaly for the target product.

16. The non-transitory computer-readable medium of claim 15, wherein calculating the first similarity score further comprises:
calculating a first cosine similarity between an embedding for the first product and an embedding for the target product;
comparing the first cosine similarity with a similarity threshold; and
in response to the first cosine similarity exceeding the similarity threshold, determining the first product and the target product are similar and setting the first similarity score to 1.

17. The non-transitory computer-readable medium of claim 16, wherein calculating the second similarity score further comprises:
calculating a second cosine similarity between an embedding for the second product and the embedding for the target product;
comparing the second cosine similarity with the similarity threshold; and
in response to the second cosine similarity falling below the similarity threshold, determining the second product and the target product are dissimilar and setting the second similarity score to 0.

18. The non-transitory computer-readable medium of claim 15, wherein the regularization penalty comprises:
a sum of at least a first contrastive loss function associated with the first distance and a second contrastive loss function associated with the second distance.

19. The non-transitory computer-readable medium of claim 18, wherein the first contrastive loss function comprises:
a product of $Z_{T,1} d(\vec{\beta}_T, \vec{\beta}_1)$, wherein $Z_{T,1}$ is the first similarity score between the first product and the target product, and wherein $d(\vec{\beta}_T, \vec{\beta}_1)$ is the first distance.

20. The non-transitory computer-readable medium of claim 18, wherein the second contrastive loss function comprises:
a product of $(1-Z_{T,2}) \max\{0, m - d(\vec{\beta}_T, \vec{\beta}_2)\}$, wherein $Z_{T,2}$ is the second similarity score between the second product and the target product, wherein $d(\vec{\beta}_T, \vec{\beta}_2)$ is the second distance, and wherein m is a minimum margin parameter.

* * * * *